United States Patent Office 3,780,162
Patented Dec. 18, 1973

3,780,162
PREPARATION OF PHOSPHONITRILIC CHLORIDE
Charles R. Bergeron and James T. F. Kao, Baton Rouge, La., assignors to Ethyl Corporation, Richmond, Va.
No Drawing. Filed June 5, 1972, Ser. No. 259,669
Int. Cl. C01b 25/10
U.S. Cl. 423—300                                11 Claims

ABSTRACT OF THE DISCLOSURE

Process for the preparation of phosphonitrilic chloride from phosphorus pentachloride and ammonia in the presence of hydrogen chloride by carrying out the process under a pressure of hydrogen chloride ranging from 10 to about 40 p.s.i.g. The reaction product produced in good yield is a low molecular weight polymeric mixture primarily of cyclic trimer and tetramer.

BACKGROUND OF THE INVENTION

The formation of phosphonitrilic chlorides by the reaction of phosphorus pentachloride with ammonium chloride has been known since about 1897; Stokes, Am. Chem. J., vol. 19, page 782 (1897); Schenck et al., Berichte, vol. 57b, page 1343 (1924). In spite of the length of time the reaction has been known its "mechanism is still not completely understood"; Enesley et al., J. Chem. Soc. (A), page 768 (1971). The use of monochlorobenzene as the solvent is also known; Jaszke et al., U.S. 3,367,750.

U.S. 3,656,916 to Schiedermaier et al. teaches the reaction of ammonia with phosphorus pentachloride to produce phosphonitrilic chlorides using a specific feed rate of ammonia such that the first $\frac{1}{10}$ to $\frac{1}{3}$ of the total ammonia is added to a solution of not more than 5 moles of phosphorus pentachloride per liter of inert solvent at a rate not exceeding 0.12 liter/minute-mole phosphorus pentachloride present in the solution. The remainder is added at a rate higher than the initial amount of ammonia. The advantage indicated for the specific ammonia addition rate is to obtain a low molecular weight product having a high percentage of cyclic trimeric and tetrameric phosphonitrilic chloride in the reaction product. Higher feed rates of ammonia produce high molecular weight phosphonitrilic chlorides which are only partially soluble in hydrocarbons, for example cyclohexane or petroleum ether.

The Jaszka patent also teaches the use of finely divided ammonium chloride of increased surface area for reaction with the phosphorus pentachloride in the solvent. The ammonium chloride is not soluble in the reaction mixture and the reaction takes place on the surface of the ammonium chloride. Therefore, a small particle ammonium chloride is highly reactive.

The Jaszka patent, however, teaches the production of ammonium chloride by reacting ammonia and hydrogen chloride in an inert solvent and introducing the phosphorus pentachloride to the dispersion of small particle ammonium chloride. In contrast to both the Jaszka and the Schiedermaier et al. patents, it has now been found that an advantageous process for producing low molecular weight phosphonitrilic chloride polymers is provided by a process which includes one step reaction with a high ammonia feed rate to phosphorus pentachloride in a solvent in the presence of hydrogen chloride. This process has the advantage of a one-step reaction to produce phosphonitrile chloride in contrast to the Jaszka patent and, additionally, employs a higher feed rate than is indicated to be possible in the Schiedermaier et al. patent.

By operating according to the process of this invention, by-product reaction of $PCl_5$ with ammonia is reduced, the thick practically unstirrable reaction mixture formed by unknown reaction intermediates is avoided, losses of ammonium chloride as fine dust are minimized, relatively short reaction times are realized, and the product has a low molecular weight without the low yields heretofore associated therewith.

SUMMARY OF THE INVENTION

This invention provides a process for the manufacture of phosphonitrilic chloride mixtures of the general formula $[PNCl_2]_x$ wherein $x$ is at least 3, said process comprising introducing ammonia into a slurry of phosphorus pentachloride in an inert solvent, said process being carried out in the presence of an initially added amount of HCl. In a preferred aspect of this invention, the process is carried out by introducing the ammonia at the beginning of the reaction into the slurry at a rate of not less than about 0.13 liter per minute per mole of phosphorus pentachloride until an amount corresponding to about $\frac{1}{10}$ to about $\frac{1}{2}$ of the total ammonia has been added. Further, the reaction is preferably carried out under slight pressure of HCl to facilitate formation of ammonium chloride in situ.

DESCRIPTION OF THE PREFERRED EMBODIMENTS

The starting material for this process is phosphorus pentachloride. Preparation of $PCl_5$ is known and described in early literature. It can be prepared from phosphorus and chlorine generally by reacting through an intermediate $PCl_3$ stage. The process can be conducted by combining $PCl_3$ with liquid or gaseous chlorine in the absence of a solvent; Marsh, U.S. 1,914,750; Inorganic Synthesis, vol. 1, page 99 (1939). The process can be conducted using carbon tetrachloride as the solvent. Kirk-Othmer, "Encyclopedia of Chemical Technology," Interscience Encyclopedia, Inc., New York, N.Y., vol. 10, page 479 (1953). In a co-pending application, Ser. No. 174,129, filed Aug. 23, 1971, of Braxton, there is disclosed a process for preparation of phosphorus pentachloride which teaches the reaction of $PCl_3$ and gaseous chlorine using a halogenated aromatic solvent. This process is advantageous because the $PCl_5$ in monochlorobenzene is to be further reacted to phosphonitrilic chlorides.

The amount of phosphorus pentachloride is not critical and can be conveniently selected according to general engineering practices and economics of investment and operation. Generally, from about 1 to about 5 moles of $PCl_5$ per liter of solvent can be employed. For purposes of this discussion, the concentration of $PCl_5$ will be 1 mole of $PCl_5$ as the basis for the reactants involved.

As indicated above, the solvent does not appear to be critical. Several solvents are known for the reaction to produce phosphorus pentachloride and these would also be useful for the production of phosphonitrilic chlorides. Generally, the halogenated hydrocarbon solvents are suitable for the process of this invention. Particularly, the chlorinated hydrocarbons are useful. Typical of these are 1,1,2,2-tetrachloroethane, chloroform, carbon tetrachloride, and the like. Similarly, the aromatic halogenated solvents, particularly the chlorinated solvents, are also useful in this invention. Preferably monochlorobenzene is employed. The amount of solvent required is not critical. Generally, enough solvent should be used to maintain a substantially fluid mixture. It has generally been found that from about 0.2 to about 1 liter of solvent per mole of $PCl_5$ may be used. Both lower and higher amounts of solvent may also be employed. However, at the lower range of solvent used, the reaction mixture becomes thick and the slurry may not be readily agitated. On the other hand, at higher solvent volumes, too much of the reactor space is taken up with the solvent thus requiring larger reactors and accessory equipment for the same amount of product produced.

According to this invention, hydrogen chloride is dissolved in a slurry of phosphorus pentachloride in a solvent under slight pressure. The hydrogen chloride can be in any form which does not cause deleterious side reactions during subsequent processing, however gaseous hydrogen chloride is preferred. Particularly preferred is anhydrous hydrogen chloride gas because any water present reacts to form undesirable by-products during further reaction. Pressure and stirring are used to dissolve the hydrogen chloride in the halogenated hydrocarbon solvent. Generally, nominal pressures are used so that expensive high-pressure reaction equipment is not necessary. Only sufficient pressure to dissolve an amount of hydrogen chloride necessary to initiate the reaction is necessary. Typically, this can be less than about 3 atmospheres. Preferably, the reactor is pressurized to from about 10 to about 40 p.s.i.g. of HCl. On introduction of the hydrogen chloride into the reactor, the system is agitated so that more hydrogen chloride can be dissolved. A most preferred pressure is from about 15 to about 30 p.s.i.g. of hydrogen chloride. Although higher pressures can be used they tend to retard the reaction. Further, lower pressures may be used but less HCl is dissolved in the solvent.

The hydrogen chloride serves as an initially available reactant with ammonia for producing ammonium chloride in situ. The ammonium chloride produced in this manner is finely divided. Generally, particles ranging from about 10 microns or less are produced by reaction of ammonia and hydrogen chloride in situ. The smaller the particles, the more reactive they are because the reaction of ammonium chloride and phosphorus pentachloride is a surface reaction. The hydrogen chloride does not have to be continuously fed into the reactor. Only a small amount of initially added hydrogen chloride is necessary for reaction with ammonia. The ammonium chloride produced then reacts with $PCl_5$ to produce phosphonitrilic chloride. This reaction liberates additional hydrogen chloride for further reaction with the ammonia fed into the reactor. Therefore, only an amount of HCl sufficient to initiate the reaction on introducing to the reaction mixture up to about ½ of the initial amount of ammonia is required. Preferably, from about 0.1 to about 0.5 mole of HCl is employed. Preferably, from 0.15 to about 0.25 mole of HCl per mole of phosphorus pentachloride is initially dissolved in the solvent.

After establishing a slurry of $PCl_5$ in a suitable solvent and pressurizing the reactor with hydrogen chloride while stirring, ammonia is fed into the reactor and the reaction mixture heated to reaction temperature. The form of ammonia feed is not important and either liquid or gaseous ammonia may be used with the latter being preferred. The use of liquid ammonia requiring high pressure causes problems because it would be difficult to control and under the reaction conditions would vaporize to form a gas. Therefore, the use of gaseous ammonia is more convenient. The feed rate to the reactor is an important variable because the reaction is controlled through the rate of ammonia feed. Preferably, the ammonia is fed at a high rate initially in order to react with the large amounts of $PCl_5$ present in the reactor. Since the reaction of ammonia with hydrogen chloride is exothermic, the high initial ammonia rate aids in raising the temperature so that the reacton can quickly start, thereby shortening the overall reaction time and also avoiding the accumulation of insoluble $NH_4Cl$ and intermediates which could cause a thick reaction mass. The presence of HCl and its reaction with ammonia avoids the formation of by-products resulting from the reaction of ammonia with $PCl_5$ directly. The ammonia is preferably fed into the reactor at a rate of not less than about 0.13 liter per minute per mole of phosphorus pentachloride until an amount corresponding to about 1/10 to about ½ of the total ammonia has been added. More preferably the ammonia is fed into the reactor at a rate of not less than 0.13 liter per minute per mole of phosphorus pentachloride until an amount corresponding to about 1/5 to 1/3 of the total ammonia has been added. More preferably the initial ammonia feed rate is from about 0.13 to about 0.4 liter per minute per mole of $PCl_5$.

On introducing ammonia into the reactor, the reaction mixture is heated to 110° to 150° C., preferably, from 120 to 130° C. The reaction between ammonia and hydrogen chloride takes place and ammonium chloride is formed when ammonia is introduced. This then reacts with the $PCl_5$ to produce an insoluble intermediate when the reaction mixture is heated to about 60° C. Continuing heating to 110° C. to 150° C. is necessary so that the intermediate reacts further with ammonium chloride to produce phosphonitrilic chloride. On reaction to form phosphonitrilic chloride, about 4 equivalents of hydrogen chloride are evolved. This hydrogen chloride is available to react with further ammonia beginning the reaction sequence again. Since not all of the hydrogen chloride evolved is utilized, a portion is vented from the reactor. However, the reactor is maintained under suitable pressure of from about 10 to about 40 p.s.i.g. of hydrogen chloride, during the entire time that ammonia is fed. This hydrogen chloride pressure not only guarantees that there will always be sufficient hydrogen chloride to quickly react with all the ammonia, but it also greatly reduces the amount of solvent vaporized with the excess hydrogen chloride evolved in the reaction.

Since the overall reaction is endothermic, reducing the solvent vaporized greatly reduces the amount of heat which must be supplied and overcomes heat input limitations in large process vessels where heat transfer surfaces to volume ratios are small. The elevated pressure also reduces the linear velocity of the evolved hydrogen chloride, thereby reducing the tendency for entrainment of fine ammonium chloride dust. Preferably the initial feed rate of ammonia is maintained until the large amount of phosphorus pentachloride present at the beginning of the reaction is decreased considerably and the reaction is proceeding smoothly. After not more than ½ of the ammonia is added, the feed rate is decreased to less than 0.13 liter of ammonia per minute per mole of phosphorus pentachloride. Preferably, the remaining ammonia is introduced at a rate of from about 0.05 to about 0.13 liter per minute per mole of phosphorus pentachloride. Reducing the ammonia feed has the effect of slowing the reaction and hence the evolution of HCl. This is important to avoid blowing the fine ammonium chloride dust, produced on reaction of ammonia and hydrogen chloride, out of the reactor with the hydrogen chloride evolved. In addition, reducing the ammonia feed rate slows the rate of accumulation of the insoluble intermediate so that the reaction mixture does not become too thick to be stirred. Generally, the amount of ammonia required is only sufficient ammonia to react as ammonium chloride with the phosphorus pentachloride in the system. In most cases, however, a small excess can be used without changing the nature of the reaction. Ammonia, as ammonium chloride, and phosphorus pentachloride react on a 1:1 mole basis, therefore the amount of ammonia used ranges from about 1 to about 1.5 moles of ammonia per mole of $PCl_5$. In contrast to prior art processes which employ an initially low and then a high rate of feeding ammonia to the $PCl_5$ slurry, this process employs an initial amount of hydrogen chloride to initiate the reaction, feeds the ammonia at a high rate initially to accumulate enough ammonium chloride to give a reasonable high reaction rate but not so much to cause a thick, unstirrable stage in the reaction caused by reaction intermediates, which are insoluble in the system, and then decreases the feed rate to reduce the possibility of blowing ammonium chloride dust formed in situ out of the reactor with the evolved hydrogen chloride.

In general, the overall process may be described as follows. The phosphorus pentachloride slurried in monochlorobenzene is charged to the reactor. The reactor is sealed and hydrogen chloride gas is introduced into the reactor with agitation so that the hydrogen chloride is more readily dissolved in the solvent. The reactor pressure is held at from about 10 to about 40 p.s.i.g. of hydrogen chloride. The ammonia is then introduced at a rate of not less than about 0.13 liter per minute per mole of PCl₅ and the heat is applied to raise the temperature of the reaction mixture to 110° C. to 150° C. during this initial ammonia feed. The hydrogen chloride pressure will fall at first, and additional hydrogen chloride can be added to maintain the desired pressure. However this is not essential if the initial pressure is at least 10 p.s.i.g. at the start of ammonia feed since by-product hydrogen chloride will be produced before all of the preadded hydrogen chloride is used up. The reaction between ammonium chloride and PCL₅ initiates at about 60° C. The temperature rises to about 110–140° C. The feed rate of ammonia is reduced after about ½ hour and held to a rate of from about 0.05 to about 0.13 liter per minute per mole of PCl₅. This rate is continued for about three hours, or depending upon the amount fed until at least the stoichiometric amount of ammonia is added. After the ammonia has been fed into the reaction, the temperature is maintained for about 1 hour at between 110–150° C., preferably from 120° C. to 130° C., under pressure from 10–40 p.s.i.g. and preferably about 20 p.s.i.g. This heating period finishes the reaction by allowing traces of unreacted material to react. After about 1 hour the pressure is released and heating is continued for another ½ hour at reaction temperature. This allows any remaining hydrogen chloride dissolved in the solvent to be removed.

The product of this reaction is generally 65–75 percent cyclic phosphonitrilic chloride polymers and 35–25 percent linear materials. In general, the cyclic distribution ranges from 60–75 percent trimer, 18–24 percent tetramer, and 7–12 percent of pentamer. The product yield ranges upward of 90 percent, based on the amount of phosphorus used. Yields higher than 92 percent are not uncommon. In contrast, products of prior art processes have cyclic products ranging from 80–85 percent cyclic using lower feed rates followed by higher feed rates of ammonia. Moreover, the traditional process for producing phosphonitrilic chloride using a solid ammonium chloride of commercial grade and a halogenated aliphatic hydrocarbon solvent produces a generally higher molecular weight product consisting of about 50 percent cyclics and about 50 percent linears.

The process of this invention is more clearly illustrated by reference to the following examples. The examples are illustrative only and should not be considered limiting of of the invention.

EXAMPLE I

To a glass reactor equipped with stirrer, a reflux condenser and a means for heating the reactor contents was charged 208.3 grams (1.0 mole) of phosphorus pentachloride in 312.5 grams of monochlorobenzene. The reactor was sealed and anhydrous hydrogen chloride was fed into the reactor with stirring until the pressure of the reactor was about 15 p.s.i.g. A total of 7.6 grams (0.208 mole) of hydrogen chloride was added to the reactor. Gaseous ammonia was then introduced to the reactor at a rate of 0.182 liter per minute per mole of phosphorus pentachloride while the reactor contents were heated at a rate of 2.5° C. per minute using a heating mantle on the reactor. The ammonia feed rate was dropped to 0.0908 liter per minute per mole of phosphorus pentachloride after about 5.46 liters (0.241 mole) of ammonia was fed into the reactor over a period of about 30 minutes. The temperature was controlled at 130° C. and pressure at 20.0 p.s.i.g. The ammonia feed was stopped when a total of 22 liters (1.0 mole) was fed into the reactor. The heating and stirring was continued for one houur at 20 p.s.i.g., and for another 30 minutes at atmospheric pressure. The total reaction time was 5½ hours. The reactor contents were then cooled to room temperature and discharged from the reactor by nitrogen pressure. About 400 grams of clear product solution was obtained. Analysis by vapor phase chromatography showed that the solution contained 26.6 percent phosphonitrilic chlorides of which 63.3 percent were cyclic compounds with the following distribution: trimer—73 percent, tetramer—20 percent, and pentamer—7 percent. The recovered yield was 92 percent, based on phosphorus pentachloride.

EXAMPLE II

The procedure of Example I was repeated, except that a total of 22.8 liters (1.047 mole) of ammonia was fed to the reactor and the initial heating rate was 1.5° C. per minute. The reaction was initiated at 65° C. as observed by a sudden change in the rate of temperature increase. The reaction mixture was heated to 130° C. over two hours period and held at that temperature for three hours. The product slurry, about 392.5 grams, was obtained after 5½ hours reaction time. Vapor phase chromatograph analysis of the product showed 67.7 percent cyclic phosphonitrilic chloride polymers having the following distribution: trimer—64 percent, tetramer—24 percent, pentamer—12 percent. The recovered yield of total product was 92 percent, based on phosphorus pentachloride.

The procedure of Example I was repeated with different reaction times and temperatures. Ammonia was fed at the same rate with 10 percent excess (1.1 mole total) (Example III and IV) to 2 percent short (0.98 mole total) (Example V). The results of these experiments are shown in the following table.

TABLE I.—PREPARATION OF PHOSPHONITRILIC CHLORIDE

| | Reaction | | Percent | | | | |
| --- | --- | --- | --- | --- | --- | --- | --- |
| | | | Product distribution | | | | |
| Ex. | Temp., °C. | Time, hrs. | Trimer | Tetramer | Pentamer | Cyclics | Yield |
| III | 120 | 7½ | 65 | 20 | 15 | 75 | 85 |
| IV | 140 | 4½ | 73 | 18 | 9 | 77 | 74 |
| V | 150 | 4 | 90 | 8 | 2 | 50 | 80 |

EXAMPLE VI

The procedure of Example I is repeated except that 15.6 liters (0.712 mole) of ammonia was fed at a rate of about 0.389 liter per minute per mole of phosphorus pentachloride initially. The reaction mixture became very thick and was difficult to stir. The ammonia feed was discontinued, and heat was applied for about 2 hours at 115° C. The reaction mixture became fluid again and an additional 9.07 liters (0.412 mole) of ammonia was fed to the reactor at a rate of 0.389 liter per minute per mole of phosphorus pentachloride. A sample was taken after an additional 2 hours of heating time at a temperature of between 120 and 130° C. The yield, based on vapor phase chromatograph analysis was 77 percent of total product, based on phosphorus pentachloride.

The foregoing examples clearly indicate the advantages of the process of this situation. Higher temperatures, as in Example IV and V, decreased the overall yield. Also unnecessarily long reaction times, as in Example III, do not increase the yields nor do they increase the amount of cyclic products produced. As seen in Example VI, the high rate of feeding of ammonia when continued throughout the reaction and when more than ½ of the total ammonia was introduced developed a thick unstirrable reaction mixture and produced lower yields of phosphonitrilic chlorides. Using the process of this invention it can therefore be seen that an improved product is produced without process difficulties encountered using lower rates of feed and shifting to higher rates of ammonia feed after the initial amount is added.

The foregoing description of the invention is illustrative only and should not be construed to limit the invention. Having described the invention, what is claimed is:

1. A process for the manufacture of phosphonitrilic chloride mixtures of the general formula $[PNCl_2]_x$, wherein x is at least 3, said process comprising reacting ammonia with a slurry of phosphorus pentachloride in an inert solvent, said ammonia being introduced into said slurry at the beginning of the reaction at a rate of not less than about 0.13 liter per minute per mole of phosphorus pentachloride until an amount corresponding to about $\frac{1}{10}$ to about $\frac{1}{2}$ of the total ammonia has been added, said process being carried out in the presence of HCl initially added under sufficient pressure to dissolve an amount of HCl sufficient to initiate the reaction.

2. A process of claim 1 wherein said ammonia is gaseous.

3. A process of claim 1 wherein said process is carried out under a pressure of from about 10 to about 40 p.s.i.g. of HCl.

4. A process of claim 1 wherein said HCl is anhydrous.

5. A process of claim 1 wherein said process is carried out under a pressure of from about 15 to about 30 p.s.i.g. of HCl.

6. A process of claim 1 wherein said ammonia is gaseous and said ammonia is introduced at a rate of from about 0.13 to about 0.4 liter per minute per mole of phosphorus pentachloride at the beginning of the reaction until an amount of from about $\frac{1}{10}$ to about $\frac{1}{2}$ of the total ammonia is added, with the remaining ammonia being introduced at a rate lower than the initial rate.

7. A process of claim 1 wherein said process is carried out at a temperature of from about 60° to about 150° C.

8. A process of claim 1 wherein the process is carried out under a pressure of from about 15 to about 30 p.s.i.g. of hydrogen chloride, said ammonia is gaseous, and said ammonia is introduced at a rate of from about 0.13 to about 0.4 liter per minute per mole of phosphorus pentachloride at the beginning of the reaction until an amount corresponding to from about $\frac{1}{10}$ to about $\frac{1}{2}$ of the total ammonia has been introduced to the reaction mixture.

9. A process of claim 3 wherein the reaction mixture is heated for an additional period of about one hour after the ammonia has been added and then the HCl pressure is released while maintaining the temperature for an additional one-half hour and then cooling the reaction mixture.

10. A process of claim 9 wherein the reaction mixture is heated for an additional period of about one hour after the ammonia has been added and then the HCl pressure is released while maintaining the temperature for an additional one-half hour and then cooling the reaction mixture.

11. A process of claim 1 wherein said ammonia is gaseous and said ammonia is introduced at a rate of from about 0.13 to about 0.4 liter per minute per mole of phosphorus pentachloride at the beginning of the reaction until an amount of from about $\frac{1}{5}$ to about $\frac{1}{3}$ of the total ammonia is added, with the remaining ammonia being introduced at a rate lower than the initial rate.

References Cited
UNITED STATES PATENTS

| | | |
|---|---|---|
| 3,656,916 | 4/1972 | Schiedermaier et al. __ 423—300 |
| 3,658,487 | 4/1972 | Wunsch et al. _____ 423—300 |
| 3,367,750 | 2/1968 | Jaszka et al. _____ 423—300 |

OSCAR R. VERTIZ, Primary Examiner

G. A. HELLER, Assistant Examiner